Jan. 9, 1940.  E. F-G. GIBBS  2,186,921
LIVE CENTER
Filed Sept. 9, 1938
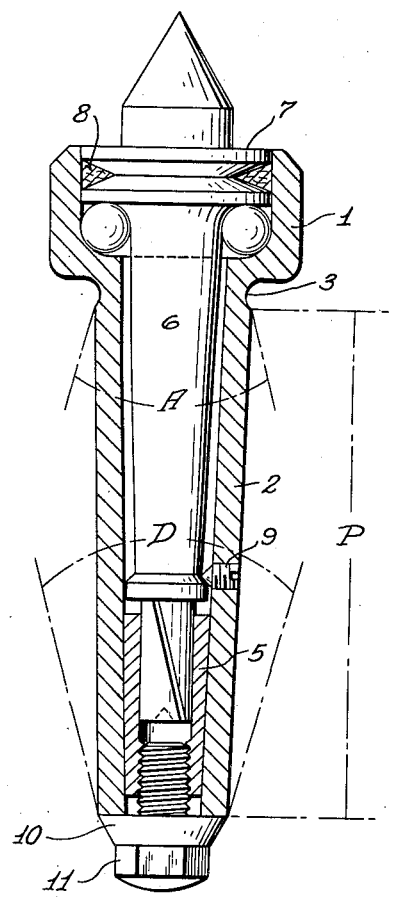
INVENTOR.
Edward F-G Gibbs Patented Jan. 9, 1940

2,186,921

UNITED STATES PATENT OFFICE 2,186,921

LIVE CENTER

Edward F-G. Gibbs, Detroit, Mich.

Application September 9, 1938, Serial No. 229,179

2 Claims. (Cl. 82—33)

This invention relates to new and useful improvements in live centers and spindles used mostly in the tailstock of the ordinary engine lathes and other tool machines. I do not mean to limit myself, however in any respect, except as required by the scope of the claims.

The objects sought here, under the extremely exacting conditions, are to develop a center with ample strength, yet resilient, accurate, and with ample rotary ease, and having the shortest practical overhang, and smallest head. I attain these objects by the mechanism hereinafter described, shown in the accompanying drawing, which forms a part of this specification, and specifically defined in the appended claims.

Referring now to the figure of the drawing, which is a central sectional view of the housing member, and of the rear end tapered bushing, exposing the cone pointed spindle, bearing balls, the headless retainer screw, the rear end collar and screw, all in working position.

Reference now being had to the various elements of the subject by numerals, in which similar digits refer to similar parts throughout.

Digit 1 designates the housing head, digit 2 its rear end bearing shank, digit 3 the undercut fillet which connects the housing head and rear end shank, 4 the bearing balls, 5 the rear end tapered bushing, 6 the cone pointed rotary spindle, 7 the large flange, integral with the said spindle and near its front end, 8 the packing box, cut into the periphery of the said flange, 9, the headless retainer screw, 10 the rear end retainer collar, and 11 the rear end retainer screw. Elements 10 and 11, combined constitute the rear end retainer. Letters A, D, and P, refer to the taper dimensions of the rear end bearing shank.

Having thus described my invention, I claim the following:

1. A ball bearing center comprising a member having a head, serving as a ball-cup at its front end, and a bearing shank extending rearwardly, the two being connected by an undercut fillet, which permits the head to spring backward under axial pressure, bearing balls in the said head, a tapered bushing in the rear of the said shank, a rotary center spindle, supported by the said balls in the head, and the tapered bushing in the rear of the said shank, a large flange near the front end of the said spindle, the rear face of which serves as a ball-race, while the close fitting peripheral face of the said flange rotates freely in the said ball-cup, and a headless retainer screw through the wall of the said shank holds the spindle in position, all substantially as shown and described.

2. A ball bearing center comprising a member having a head serving as a ball cup at its front end and a bearing shank extending rearwardly, the two being connected by an undercut fillet which permits the head to spring backward under axial pressure, bearing balls in the said head, a tapered bushing in the rear of the said shank, a rotary center spindle supported by the said balls in the head, and the tapered bushing in the rear of the said shank, a large flange near the front end of the said spindle, the rear face of which serves as a ball race, while the close-fitting peripheral face of the said flange rotates freely in the said ball cup, it is deeply grooved, and becomes a packing box, a headless screw through the wall of the said shank holds the spindle in position, all substantially as set forth.

EDWARD F-G. GIBBS.